(12) United States Patent
Koers et al.

(10) Patent No.: US 9,382,413 B2
(45) Date of Patent: Jul. 5, 2016

(54) DUAL CURE SYSTEM

(71) Applicant: Akzo Nobel Chemicals International B.V., Amersfoort (NL)

(72) Inventors: Frederik Willem Karel Koers, Epse (NL); Auke Gerardus Talma, Bathmen (NL)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 58 days.

(21) Appl. No.: 14/361,563

(22) PCT Filed: Nov. 29, 2012

(86) PCT No.: PCT/EP2012/073889
§ 371 (c)(1),
(2) Date: May 29, 2014

(87) PCT Pub. No.: WO2013/079563
PCT Pub. Date: Jun. 6, 2013

(65) Prior Publication Data
US 2014/0323613 A1    Oct. 30, 2014

Related U.S. Application Data

(60) Provisional application No. 61/569,879, filed on Dec. 13, 2011.

(30) Foreign Application Priority Data

Dec. 2, 2011 (EP) .................................... 11191660

(51) Int. Cl.
| | |
|---|---|
| *C08L 63/00* | (2006.01) |
| *C08L 63/10* | (2006.01) |
| *C08L 67/06* | (2006.01) |
| *C09D 163/00* | (2006.01) |
| *C09D 163/10* | (2006.01) |
| *C09D 167/06* | (2006.01) |
| *C08G 59/50* | (2006.01) |
| *C08L 33/04* | (2006.01) |
| *C09J 167/06* | (2006.01) |
| *C08G 59/56* | (2006.01) |
| *C08G 59/68* | (2006.01) |
| *C09J 163/00* | (2006.01) |

(52) U.S. Cl.
CPC ................ *C08L 33/04* (2013.01); *C08G 59/50* (2013.01); *C08L 63/00* (2013.01); *C08L 67/06* (2013.01); *C09D 167/06* (2013.01); *C09J 167/06* (2013.01); *C09D 163/00* (2013.01); *C09J 163/00* (2013.01)

(58) Field of Classification Search
None
See application file for complete search history.

(56) References Cited

U.S. PATENT DOCUMENTS

| | | | |
|---|---|---|---|
| 2,859,199 A | 11/1958 | Parker | |
| 3,508,951 A | 4/1970 | Shimp et al. | |
| 4,394,461 A | 7/1983 | Stott | |
| 6,048,488 A | 4/2000 | Fink et al. | |
| 2002/0137972 A1* | 9/2002 | Syed ................... | C08F 299/045 568/304 |

FOREIGN PATENT DOCUMENTS

| | | |
|---|---|---|
| EP | 2 357 162 A1 | 8/2011 |
| GB | 1 205 682 | 9/1970 |
| GB | 1 453 306 | 10/1976 |
| GB | 2 342 600 A | 4/2000 |
| JP | S59-081343 A | 5/1984 |
| JP | 6-33020 A | 2/1994 |
| WO | WO 2008/002842 A1 | 1/2008 |
| WO | WO 2010/052296 A1 * 5/2010 ............... C09D 5/03 |
| WO | WO 2011/083309 A1 | 7/2011 |
| WO | WO 2011/098561 A1 | 8/2011 |
| WO | WO 2011/098562 A1 | 8/2011 |
| WO | WO 2011/098564 A1 | 8/2011 |
| WO | WO 2011/098566 A1 | 8/2011 |

OTHER PUBLICATIONS

Third Party Observation filed against corresponding Japanese application No. 2014-543879 dated Jul. 8, 2015 and English translation of the same.
Okata et al., "Organic Peroxide Chemistry," Jan. 15, 1971, pp. 91-95 (cited in B3).
European Search Report mailed Jun. 14, 2012 for related EP Application No. 11191660.7.
International Search Report and Written Opinion mailed May 8, 2013 for related PCT Application No. PCT/EP2012/073889.
English abstract of JP 6-33020 A published Feb. 8, 1994.

* cited by examiner

*Primary Examiner* — Michael J Feely
(74) *Attorney, Agent, or Firm* — Alice C. Su

(57) ABSTRACT

Multi-pack curable composition comprising: a first pack comprising a blend of (i) an epoxy resin, (ii) an unsaturated polyester or vinyl ester resin, and optionally (iii) a peroxyester, a second pack comprising an amine curing agent for the epoxy resin and at least one transition metal compound selected from iron, copper, and manganese compounds, and at least when the first pack does not contain a peroxyester, a third pack comprising a peroxide.

20 Claims, No Drawings

DUAL CURE SYSTEM

This application is a national stage filing under 35 U.S.C. §371 of PCT/EP2012/073889, filed Nov. 29, 2012, which claims priority to European Patent Application No. 11191660.7, filed Dec. 2, 2011, and U.S. Provisional Patent Application No. 61/569,879, filed on Dec. 13, 2011, the contents of which are incorporated herein by reference in their entirety.

The present application relates to the cure of a blend of (i) an epoxy resin and (ii) an unsaturated polyester or vinyl ester resin, using a peroxide, a curing agent for an epoxy resin, and a metal accelerator.

Thermosetting polyester resins and thermosetting epoxy resins are each well known compositions having utility in reinforced and unreinforced plastics as well as in coatings. The polyester resins, which are unsaturated polyester-unsaturated monomer mixtures, have a low viscosity in the uncured state and have good flow, wetting, and penetrating properties. When cured, the polyester resins have good chemical (particularly acid) resistance and good weathering properties. However, these resins exhibit high shrinkage upon cure and the cured resins have poor impact resistance and poor adhesion to many substrates, particularly concrete and carbon fibres.

Thermosetting epoxy resins in general have higher viscosities than thermosetting polyester resins, with correspondingly poorer flow, wetting, and penetrating properties.

Epoxy resins cured at room temperature with conventional aliphatic amines have somewhat poor acid resistance. Furthermore, they are far more expensive than polyester resins. However, epoxy resins exhibit low shrinkage upon cure and the cured compositions have good impact resistance and outstanding adhesion to a variety of substrates, including carbon fibres.

Various attempts have been made to combine thermosetting epoxy resins and thermosetting polyester resins in order to take advantage of the good properties of each.

For instance, U.S. Pat. No. 2,859,199 describes heat curable compositions made from an epoxy resin, an unsaturated polyester, and a vinyl monomer. These materials are said to co-react at temperatures of 75° C. to 300° C. to form cross-linked products.

A room-temperature curable blend of a thermosetting resin and an epoxy/amine thermosetting resin has been disclosed by U.S. Pat. No. 3,508,951. Methyl ethyl ketone and cobalt naphthenate were used as the respective peroxide and accelerator for polyester cure and an aromatic amine was said to be required for getting sufficient hardness.

It has now, surprisingly, been found that the hardness of cured polyester/epoxy blends can be further improved by using, instead of a solely Co-based curing accelerator, an accelerator containing iron, manganese, and/or copper.

The present invention therefore relates to a multi-pack curable composition comprising:
- a first pack comprising a blend of (i) an epoxy resin, (ii) an unsaturated polyester or vinyl ester resin, and optionally (iii) a peroxyester,
- a second pack comprising an amine curing agent for the epoxy resin and at least one transition metal compound selected from iron, copper, and manganese compounds, and
- at least when the first pack does not contain a peroxyester, a third pack comprising a peroxide.

Although similar systems have been described recently in WO 2011/09851, WO 2011/098566, WO 2011/098564, and WO 2011/098562, the compositions disclosed in these documents all have the metal accelerator in the resin-containing pack. It has now been found that it is possible to obtain good curing with systems containing the metal accelerator in the amine-containing pack.

This is surprising, because systems containing cobalt compounds in the amine-containing pack have been found to lead to unsatisfactory cure behavior, such as foaming of the resin, low curing activity, and low product hardness.

The presence of the accelerator in the amine-containing pack (instead of the resin-containing pack) allows for the incorporation of more accelerator into the system (because the amount of accelerator that can be included in a resin is rather limited) and for the absence of inhibitors/storage stabilizers to stabilize the accelerator-containing resin blend.

The composition according to the present invention allows for the formation of a polyester or vinyl ester-based resin system that is compatible with a wide variety of reinforcing fibres, including carbon fibres, and has sufficient hardness after room temperature cure.

At the same time, it allows for the room temperature cure of an epoxy resin. Without being bound to theory, it is thought that the heat released during polyester/vinyl ester cure promotes epoxy cure.

The epoxy resin present in the composition according to the present invention can be any epoxy resin. It can be saturated or unsaturated, aliphatic, cycloaliphatic, aromatic or heterocyclic, monomeric or polymeric in nature. Preferred, however, are phenol-based epoxy resins. Examples of suitable phenol-based epoxy resins are the diglycidyl ethers of bisphenol A, bisphenol F, bisphenol S, resorcinol, hydroquinone, 4,4'-dihydroxydiphenylethane, 4,4'-dihydroxybenzophenone, 1,5-dihydroxynaphthalene, and 4,4'-dihydroxybiphenyl, condensed or extended glycidyl ethers of a bisphenol, and glycidyl ethers of polyhydric phenols, for example an epoxy novolac resin.

Other glycidyl ethers of polyhydric phenols are polymers prepared by reacting 1.1 up to about 2 mols of epichlorohydrin with 1 mol of dihydric phenol or by reacting di-epoxides with added dihydric phenol. Additional epoxides are glycidyl ethers of polyhydric alcohols made by reacting a polyhydric alcohol and epichlorohydrin with an acidic catalyst such as boron trifluoride and subsequently treating the resulting product with an alkaline dehydrohalogenating agent. Included among the polyhydric alcohols that can be used in the preparation of these epoxides are glycerine, ethylene glycol, propylene glycol, diethylene glycol, hexanetriol, pentaerythritol, trimethylol ethane and trimethylol propane, as well as hydroxy-containing esters, such as castor oil.

Still other epoxides are glycidyl esters of polycarboxylic acids, such acids being azelaic acid, adipic acid, isophthalic acid, terephthalic acid, dimerized and trimerized unsaturated fatty acids, etc. Useful epoxides also include epoxidized hydrocarbons, such as vinyl cyclohexene dioxide, butadiene dioxide, dicyclopentadiene dioxide, epoxidized polybutadiene, and limonene dioxide. Other epoxides are epoxidized esters, for example, epoxidized soybean oil, epoxidized glycerol trilinoleate, and 3,4-epoxycyclohexylmethyl 3,4-epoxycyclohexane carboxylate. Still other epoxides are polymers and copolymers of vinyl polymerizable monoepoxides, such monoepoxides being allyl glycidyl ether, glycidyl acrylate, and glycidyl methacrylate.

Examples of suitable unsaturated polyester (UP) or vinyl ester resins to be used in the composition of the present invention are:
- Ortho-resins: these are based on phthalic anhydride, maleic anhydride, or fumaric acid and glycols, such as 1,2-propylene glycol, ethylene glycol, diethylene glycol, methylene glycol, 1,3-propylene glycol, dipropylene glycol, tripropylene glycol, neopentyl glycol or hydrogenated bisphenol-A. Commonly the ones derived from 1,2-propylene glycol are used in combination with a reactive diluent such as styrene.

Iso-resins: these are prepared from isophthalic acid, maleic anhydride or fumaric acid, and glycols. These resins may contain higher proportions of reactive diluent than the ortho resins. (3) Bisphenol-A-fumarates: these are based on ethoxylated bisphenol-A and fumaric acid.

Chlorendics: these are prepared from chlorine/bromine containing anhydrides or phenols in the preparation of the UP resins.

Vinyl ester resins: these are resins which are mostly used because of their hydrolytic resistance and excellent mechanical properties, as well as for their low styrene emission and having unsaturated sites only in the terminal position; they are introduced by reaction of epoxy resins (e.g. diglycidyl ether of bisphenol-A, epoxies of the phenol-novolac type, or epoxies based on tetrabromobisphenol-A) or urethane resins with (meth)acrylic acid or (meth)acrylamide.

Dicyclopentadiene (DCPD) resins: these are resins obtained either by modification of any of the above resin types by Diels-Alder reaction with cyclopentadiene, or by first reacting maleic acid with dicyclopentadiene, followed by the resin manufacture as shown above for the other types of resins.

All of these resins may be modified according to methods known to the skilled man, e.g. for achieving a lower acid number, hydroxyl number or anhydride number, or for becoming more flexible due to the insertion of flexible units into the backbone, etc.

The weight ratio of epoxy resin to unsaturated polyester and vinyl ester resin in the composition according to the present invention is preferably in the range 10:90-90:10, more preferably 40:60 to 60:40.

The unsaturated polyester or vinyl ester resin may contain a monomer. Examples of suitable monomers are ethylenically unsaturated monomeric compounds such as styrene and styrene derivatives like α-methyl styrene, vinyl toluene, indene, divinyl benzene, vinyl pyrrolidone, vinyl siloxane, vinyl caprolactam, stilbene, but also diallyl phthalate, dibenzylidene acetone, allyl benzene, methyl methacrylate, methylacrylate, (meth)acrylic acid, diacrylates, dimethacrylates, acrylamides; vinyl acetate, triallyl cyanurate, triallyl isocyanurate, allyl compounds which are used for optical application (such as (di)ethylene glycol diallyl carbonate), chlorostyrene, tert-butyl styrene, tert-butylacrylate, butanediol dimethacrylate, and mixtures thereof. Suitable examples of (meth)acrylate reactive diluents are PEG200 di(meth)acrylate, 1,4-butanediol di(meth)acrylate, 1,3-butanediol di(meth)acrylate, 2,3-butanedioldi(meth)acrylate, 1,6-hexanediol di(meth)acrylate and its isomers, diethyleneglycol di(meth)acrylate, triethyleneglycol di(meth)acrylate, glycerol di(meth)acrylate, trimethylol propane di(meth)acrylate, neopentyl glycol di(meth)acrylate, dipropylene glycol di(meth)acrylate, tripropylene glycol di(meth)acrylate, PPG250 di(meth)acrylate, tricyclodecane dimethylol di(meth)acrylate, 1,10-decanediol di(meth)acrylate, tetraethylene glycol di(meth)acrylate, trimethylolpropane tri(meth)acrylate, glycidyl (meth)acrylate, bismaleimides, citraconimides, and mixtures thereof.

The amount of ethylenically unsaturated monomer in the pre-accelerated resin is preferably at least 0.1 wt %, based on the weight of the unsaturated polyester or vinyl ester resin, more preferably at least 1 wt %, and most preferably at least 5 wt %. The amount of ethylenically unsaturated monomer is preferably not more than 50 wt %, more preferably not more than 40 wt %, and most preferably not more than 35 wt %.

Additional compounds that can be present in the first pack, apart from the resins, the monomer, and the optional peroxyester, are promoters and flexibilizers. Inhibitors/storage stabilizers can also be present in the first pack, but are not required because the accelerator is in the second pack.

Examples of flexibilizers are benzyl alcohol and polysulfides.

Examples of promoters are metal carboxylate salts, 1,3-diketones, and phosphorous-containing compounds.

Examples of 1,3-diketones are acetyl acetone, benzoyl acetone, and dibenzoyl methane, and acetoacetates such as diethyl acetoacetamide, dimethyl aceto-acetamide, dipropylacetoacetamide, dibutylacetoacetamide, methyl acetoacetate, ethyl acetoacetate, propyl acetoacetate, and butylacetoacetate.

Examples of suitable metal carboxylate salts are the 2-ethyl hexanoates, octanoates, nonanoates, heptanoates, neodecanoates, and naphthenates of ammonium, alkali metals, and alkaline earth metals. A preferred alkali metal is K. The salts may be added to the accelerator solution or the resin as such, or they may be formed in situ. For example, alkali metal 2-ethyl hexanoates can be prepared in situ in the accelerator solution, after addition of the alkali metal hydroxide and 2-ethyl hexanoic acid to the solution.

Examples of phorphorous-containing compounds are phosphorous compounds with the formulae $P(R)_3$ and $P(R)_3=O$, wherein each R is independently selected from hydrogen, alkyl with 1 to 10 carbon atoms, and alkoxy groups with 1 to 10 carbon atoms. Preferably, at least two R-groups are selected from either alkyl groups or alkoxy groups. Specific examples of suitable phosphorous-containing compounds are diethyl phosphate, dibutyl phosphate, tributyl phosphate, triethyl phosphate (TEP), dibutyl phosphite, and triethyl phosphate.

Acetoacetates are particularly preferred promoters. Particularly preferred is diethyl acetoacetamide. Even more preferred is a combination of diethyl acetoacetamide and potassium 2-ethyl hexanoate. Also preferred is a combination of diethyl acetoacetamide and dibutyl phosphate.

Suitable amine curing agents for the epoxy resin include primary amines (including aliphatic, aromatic, and modified amines), polyamides, tertiary and secondary amines, and imidazoles. Preferred curing agents are amines and imidazoles. Preferred amines are polyamines. More preferred are di-amines.

Examples of suitable di-amines are isopropyl diamine, diaminomethane, 1,2-diamino ethane, 1,3-diamino propane, 1,2-diamino butane, 1,2-diamino propane, 1,4-diamino butane, 1,5 diamino pentane, 1,3-diamino pentane, 2,2-dimethyl-1,3-diaminopropane, 1,5-diamino(2 methyl)pentane, 1,6-diamino hexane, 1,7-diamino heptane, 1,8-diamino octane, 1,9-diamino nonane, 1,10-diamino decane, 1,12-diamino dodecane, 1,6-diamino-(2,2,3-trimethyl)hexane, 1,6-diamino-(2,2,4-trimethyl)hexane, 1-amino-3-aminomethyl-3,5,5-trimethylcyclohexane, 1,3-bis(aminomethyl) cyclohexane, isophorone diamine, tricyclododecane diamine, dianiline methane, dianiline ether, dianiline sulphone, 2,2',6,6'-tetraethyl dianiline methane, 1,8-diamino-3,6-dioxaoctane, 1,5-diamino-3-oxapentane, alpha, omega-polytetrahydrofuryl diamines, alpha, omega-polyglycol diamines (Jeffamine™) alpha, omega-polypropoxy diamines (Jeffamines™), alpha, omega-polyethoxy-propoxy diamines, 3,5-diamino benzoic acid, 3,4-diamino benzophenone, 1,2-diamino cyclohexane, diamino naphthalene, diamino toluene, m-xylylene diamine, and (ortho-, meta-, and para) diamino benzene.

Examples of other suitable polyamines are diethylene triamine, triethylene tetramine, tetraethylene pentamine, polyamide-amine, and adducts of any of these amines.

The amine curing agent is preferably present in the composition according to the present invention in such an amount that the molar ratio of amine functionality to epoxy functionality is in the range 1:5 to 5:1, more preferably 1:2 to 2:1, and most preferably around 1:1.

It is preferred that at least about 70 wt %, more preferably about 80 wt % of the second pack consists of amine curing agent. This amine curing agent may be one single amine or a mixture of amine curing agents.

Suitable manganese, copper, and iron compounds are their halides, nitrates, sulphates, sulphonates, phosphates, phosphonates, oxides, carboxylates, and complexes of these metals with a ligand. Examples of suitable carboxylates are lactate, 2-ethyl hexanoate, acetate, proprionate, butyrate, oxalate, laurate, oleate, linoleate, palmitate, stearate, acetyl acetonate, octanoate, nonanoate, heptanoate, neodecanoate, or naphthenate.

Examples of ligands are pyridine and the tridentate, tetradentate, pentadentate, and hexadentate nitrogen donor ligands disclosed in WO 2011/83309.

Preferred manganese compounds are manganese chloride, nitrate, sulphate, lactate, 2-ethyl hexanoate, octanoate, nonanoate, heptanoate, neodecanoate, naphthenate, and acetate, and the Mn complexes of pyridine and of the tridentate, tetradentate, pentadentate, or hexadentate nitrogen donor ligands disclosed in WO 2011/83309. Any one of Mn(II), Mn(III), Mn(IV), and Mn(VII) compounds can be used.

Preferred copper compounds are copper chloride, nitrate, sulphate, lactate, 2-ethyl hexanoate, octanoate, nonanoate, heptanoate, neodecanoate, naphthenate, and acetate. Both Cu(I) and Cu(II) compounds can be used.

Preferred iron compounds are iron chloride, nitrate, sulphate, lactate, 2-ethyl hexanoate, octanoate, nonanoate, heptanoate, neodecanoate, naphthenate, acetate, and iron complexes of pyridine or the tridentate, tetradentate, pentadentate, or hexadentate nitrogen donor ligands of WO 2011/83309. Both Fe(II) and Fe(III) can be used. More preferably, it is an iron(II) or iron (III) complex of a tridentate or pentadentate nitrogen donor ligand according to WO 2011/83309.

Preferred nitrogen donor ligands according to WO 2011/83309, for both Mn and Fe, are the bispidon ligands and the TACN-Nx ligands. The preferred bispidon ligand is dimethyl-2,4-di-(2-pyridyl)-3-methyl-7-(pyridin-2-ylmethyl)-3,7-diaza-bicyclo[3.3.1]nonan-9-one-1,5-dicarboxylate (N2py3o-Cl). The preferred TACN-Nx ligand is 1,4,7-trimethyl-1,4,7-triazacyclononane ($Me_3$-TACN).

The total amount of transition metal selected from iron, manganese, copper, and mixtures thereof in the composition according to the present invention is preferably 0.5-75 mmol/kg unsaturated polyester and vinyl ester resin, more preferably 2-50 mmol/kg, even more preferably 2-25 mmol/kg, and most preferably 2-10 mol/kg unsaturated polyester and vinyl ester resin.

In addition to the transition metal selected from iron, manganese, copper, and combinations thereof, the second pack may contain other metal compounds, selected from cobalt, titanium, vanadium, tin, chromium, nickel, molybdenum, germanium, strontium, palladium, platinum, niobium, antimony, rhenium, osmium, iridium, platinum, gold, mercury, tellurium, rubidium, and/or bismuth compounds. Cobalt compounds are the least preferred because of the legislative and toxicity problems involved with that metal.

In a preferred embodiment, no metal compounds other than iron, manganese, and/or copper compounds are present in the second pack.

The total concentration of transition metal selected from iron, manganese, copper, and mixtures thereof in the second pack is preferably 0.1-10 wt %, more preferably 0.1-5 wt %, most preferably 0.1-0.5 wt %.

In addition to the amine curing agent and the metal accelerator, the second pack may contain additional compounds, such as promoters and flexibilizers.

Examples of flexibilizers are benzyl alcohol and polysulfides.

Examples of suitable promoters are the ones listed above as suitable for incorporation into the first pack. These promoters can be present in the first pack, the second pack, or both.

The composition of the second pack may be prepared by simply mixing the ingredients, at room temperature or a slightly higher temperature (up to about 80° C.).

The peroxide present in the composition according to the present invention is used for the initiation of the curing of the unsaturated polyester or vinyl ester resin and can be any peroxide known to the skilled man for being suitable for this purpose. Preferably, the peroxide is an organic peroxide. Suitable organic peroxides include peroxycarbonates, peroxyesters, diacylperoxides, dialkylperoxides, hydroperoxides, and ketone peroxides.

The peroxide cannot be stored in the same pack as the metal accelerator and the amine curing agent, because these compounds would react. Most peroxides cannot be stored in the pack containing the resin blend either, because that also would result in premature reaction. However, peroxyesters, in particular tert-butyl peroxybenzoate and tert-butylperoxy-2-ethylhexanoate, can safely be stored in the resin-containing pack. Therefore, with this type of peroxide, it is possible for the composition according to the present invention to contain only two packs.

When other peroxides are desired to be included in the composition, a third pack containing said peroxide is required.

Preferred peroxides to be present in the composition according to the invention are hydroperoxides and ketone peroxides. Preferred hydroperoxides include cumyl hydroperoxide, 1,1,3,3-tetramethylbutyl hydroperoxide, tert-butyl hydroperoxide, isopropylcumyl hydroperoxide, tert-amyl hydroperoxide, 2,5-dimethylhexyl-2,5-dihydroperoxide, pinane hydroperoxide, and pinene hydroperoxide. Preferred ketone peroxides include methyl ethyl ketone peroxide, methyl isopropyl ketone peroxide, methyl isobutyl ketone peroxide, cyclohexanone peroxide, and acetylacetone peroxide.

Of course, also mixtures of two or more of these peroxides may be present in the composition.

It also possible to combine one or more of the above hydroperoxides or ketone peroxides with another type of peroxide, for instance a peroxyester. The latter can be present either in the first or the third pack. A preferred combination is methyl ethyl ketone peroxide and tert-butylperoxy-2-ethylhexanoate.

If the composition according to the present invention comprises a manganese compound, the use of hydroperoxides is preferred over ketone peroxides. It has turned out that the combined use of a manganese compound and a ketone peroxide can result in foaming.

For non-mangenese-containing compositions, ketone peroxides are preferably used. The most preferred ketone peroxide is methyl isopropyl ketone peroxide.

The peroxide is preferably present in the composition according to the present invention in an amount of 0.1-10 wt %, relative to the weight of unsaturated polyester and vinyl ester resin, more preferably 0.5-5 wt %, and most preferably 0.5-2 wt %.

In addition to the peroxide, the third pack may contain additional compounds, such as phlegmatizers.

Examples of suitable phlegmatizers are aliphatic hydrocarbon solvents, aromatic hydrocarbon solvents, and solvents that carry an aldehyde, ketone, ether, ester, alcohol, phosphate, or carboxylic acid group. Examples of suitable solvents are aliphatic hydrocarbon solvents such as white spirit and odourless mineral spirit (OMS), aromatic hydrocarbon solvents such naphthenes and mixtures of naphthenes and paraffins, isobutanol; pentanol; 1,2-dioximes, N-methyl pyrrolidinone, N-ethyl pyrrolidinone; dimethyl formamide (DMF); dimethylsulfoxide (DMSO); 2,2,4-trimethylpentanediol diisobutyrate (TxIB); esters such as dibutyl maleate, dibutyl succinate, ethyl acetate, butyl acetate, mono- and diesters of ketoglutaric acid, pyruvates, and esters of ascorbic acid such as ascorbic palmitate; aldehydes; mono- and diesters, more in particular diethyl malonate and succinates; 1,2-diketones, in particular diacetyl and glyoxal; benzyl alcohol; and fatty alcohols.

The resins are cured when all packs of the composition are mixed. The curing process can be carried out at any temperature from −15° C. up to 250° C., depending on the initiator system, the accelerator system, the compounds to adapt the curing rate, and the resin composition to be cured. Preferably, it is carried out at ambient temperatures commonly used in applications such as hand lay-up, spray-up, filament winding, resin transfer moulding, coating (e.g. gelcoat and standard coatings), button production, centrifugal casting, corrugated sheets or flat panels, relining systems, kitchen sinks via pouring compounds, etc. However, it can also be used in SMC, BMC, pultrusion techniques, and the like, for which temperatures up to 180° C., more preferably up to 150° C., most preferably up to 100° C., are used.

In a preferred embodiment, the resin is cured in the presence of a filler and/or a reinforcement fibre. Examples of reinforcement fibres are glass fibres, carbon fibres, aramid fibres (e.g. Twaron®), natural fibers (e.g. jute, kenaf, industrial hemp, flax (linen), ramie, etc.). Examples of fillers are quartz, sand, aluminium trihydroxide, magnesium hydroxide, chalk, calcium hydroxide, clays, and lime.

The cured resin can be subjected to a post-cure treatment to further optimize the hardness. Such post-cure treatment is generally performed at a temperature in the range 40-180° C. for 30 min to 15 hours.

The cured resins find use in various applications, including marine applications, chemical anchoring, roofing, construction, relining, pipes and tanks, flooring, windmill blades, laminates, etc.

EXAMPLES

The following materials were used in the examples below:

Palatal P4—an ortho-resin based unsaturated polyester resin (ex DSM resins)

Epikote 828—a medium viscosity liquid epoxy resin produced from bisphenol A and epichlorohydrin (ex Momentive)

Aradur 3258—a polyamine adduct epoxy curing agent (ex Huntsman)

Butanox® P50—methyl isopropyl ketone peroxide (50 wt % in dimethylphthalate; ex AkzoNobel)

Trigonox® K90—cumyl hydroperoxide peroxide (90 wt % in aromatic solvent mixture; ex AkzoNobel)

Nouryact™ CF12—a Cu-based accelerator solution ex AkzoNobel

Nouryact™ CF13—a Cu-based accelerator solution ex AkzoNobel

Nouryact™ CF20—a Mn-based accelerator solution ex AkzoNobel

Nouryact™ CF31—a Fe, Cu, and Mn-based accelerator solution ex -AkzoNobel

Nouryact™ CF32—a Fe and Cu-based accelerator solution ex AkzoNobel

Nouryact™ 553S—a Co and Cu-based accelerator solution ex AkzoNobel

Accelerator NL51-P—Cobalt(II) 2-ethylhexanoate, 6% Co, in solvent mixture (ex AkzoNobel)

Example 1

Laminate sheets were prepared from the compositions listed in Table 1, as follows.

A cleaned glass plate was covered with a polyester foil.

The three packs of a composition were thoroughly mixed and spread on the foil surface. This composition was subsequently covered by another polyester foil; any enclosed air being removed by using a roller. The polyester foil was subsequently covered by a glass plate. The resulting laminate sheets were cured at 20° C.

The potlife (geltime) is the time between the mixing of the packs and the moment mixture does not flow anymore using standard method of analysis F/72.1. This standard method of analysis is available from Akzo Nobel Polymer Chemicals.

The time required for the outer layer to lose its tackyness was determined by hand.

"slow" means that the outer layer did not became tack-free within 180 minutes.

"fair" means that the outer layer was tack-free within 60-180 minutes.

"fast" means that the outer layer was tack-free within 60 minutes.

Shore D hardness was determined by standard method ASTM D2240.

TABLE 1

| Comp. | 1 | 2 | 3 | 4 | 5 | 6 | 7 | 8 | 9 |
|---|---|---|---|---|---|---|---|---|---|
| Pack 1: | | | | | | | | | |
| Palatal P4 | 50 | 50 | 50 | 50 | 50 | 50 | 50 | 50 | 50 |
| Epikote 828 | 50 | 50 | 50 | 50 | 50 | 50 | 50 | 50 | 50 |
| Pack 2: | | | | | | | | | |
| Butanox P50 | 1 | 1 | 1 | | 1 | 1 | | | 1 |
| Trigonox K90 | | | | 1 | | | 1 | 1 | |
| Pack 3: | | | | | | | | | |
| Aradur 3258 | | 25 | 25 | 25 | 25 | 25 | 25 | 25 | 25 |
| CF12 | 0.5 | 0.5 | | | | | | | |
| CF13 | | | 0.5 | | | | | | |
| CF20 | | | | 1.5 | | | | | |
| CF31 | | | | | | | 1.5 | | |
| CF32 | | | | | | | | 1 | 1 |
| 553S | | | | | | 1 | | | |
| NL-51-P | | | | | 1 | | | | |
| Potlife (min) | 35 | 3 | 2 | 15 | 145 | 2 | 18 | 12 | 9 |
| Shore D/24 hr | Rubbery | 60-70 | 60-70 | 75-80 | rubbery slow, foaming | 55-60 | 75-80 | 75-80 | 60-70 |
| Tack-free | slow | fast | fair | fair | | fair | fast | fast | fast |

These data show that the use of Co as the only metal compound (see experiment with NL-51-P, which contains only Co as metal compound) results in a significantly slower cure than the use of Cu, Fe, and/or Mn-containing systems. Furthermore, the cured products remained rubbery when using only Co.

Example 2

Laminate sheets were prepared from the compositions listed in Table 1, as follows.

A cleaned glass plate was covered with a polyester foil.

The three packs of a composition were thoroughly mixed and spread on the foil surface. This composition was subsequently impregnated with reinforcement fibre using a roller and subsequently covered by another polyester foil; any enclosed air being removed by using a roller. The polyester foil was subsequently covered by a glass plate. The resulting laminate sheets were cured at 20° C.

Carbon-reinforced laminate sheets were produced according to this method using a carbon fibre texture and compositions 1 and 8 of Table 1. The potlife of these sheets at 20° C. was 5 and 12 minutes, respectively.

Example 3

Twaron®-reinforced laminate sheets were produced according to the method of Example 2, using Twaron® fibre fabric with composition 9 of Table 1, additionally containing 10 pbw of benzyl alcohol. The potlife of this sheet at 20° C. was 9 minutes.

Example 4

Glass fibre-reinforced laminate sheets were produced according to the method of Example 3, except for using a composition similar to composition 1 of Table 1 but containing only 0.2 pbw Nouryact CF12 and 10 pbw benzyl alcohol. The potlife of these sheets at 20° C. was 8 minutes.

Example 5

Example 5 was repeated with Twaron® fibres, resulting in the same potlife.

The invention claimed is:

1. A two-pack curable composition comprising:
   a first pack comprising a blend of (i) an epoxy resin, (ii) an unsaturated polyester or vinyl ester resin, and (iii) a peroxyester; and
   a second pack comprising an amine curing agent for the epoxy resin and at least one transition metal compound selected from iron, copper, and manganese compounds; wherein the two-pack curable composition is capable of being cured at room temperature.

2. The two-pack curable composition according to claim 1, wherein the at least one transition metal compound is a copper compound.

3. The two-pack composition according to claim 1, wherein the peroxyester is selected from tert-butylperoxybenzoate and tert-butylperoxy-2-ethylhexanoate.

4. A process for curing the two-pack curable composition according to claim 1, said process comprising mixing the first pack and the second pack.

5. The process according to claim 4, wherein the mixing is performed in the presence of at least one material selected from a reinforcement fibre and a filler.

6. The process according to claim 5, wherein the reinforcement fibre is selected from carbon fibre, glass fibre, aramid fibre, a natural fibre, and combinations thereof; and the filler is selected from sand, quartz, aluminum trihydroxide, magnesium hydroxide, chalk, calcium hydroxide, clays, and lime.

7. A three-pack curable composition comprising:
   a first pack comprising a blend of (i) an epoxy resin, (ii) an unsaturated polyester or vinyl ester resin, and (iii) an optional peroxyester;
   a second pack comprising an amine curing agent for the epoxy resin and at least one transition metal compound selected from iron, copper, and manganese compounds; and
   a third pack comprising a peroxide;
   wherein the three-pack curable composition is capable of being cured at room temperature.

8. The three-pack curable composition according to claim 7, wherein the at least one transition metal compound is a copper compound.

9. The three-pack curable composition according to claim 7, wherein the peroxyester is present in the first pack.

10. The three-pack curable composition according to claim 9, wherein the peroxyester is selected from tert-butylperoxybenzoate and tert-butylperoxy-2-ethylhexanoate.

11. The three-pack curable composition according to claim 7, wherein the peroxyester is not present in the first pack.

12. The three-pack curable composition according to claim 11, wherein the peroxide of the third pack is selected from ketone peroxides and organic hydroperoxides.

13. The three-pack curable composition according to claim 12, wherein the peroxide of the third pack is a ketone peroxide selected from the group consisting of methyl ethyl ketone peroxide, methyl iso-propyl ketone peroxide, cumyl hydroperoxide, 1,1,3,3-tetramethylbutyl hydroperoxide, and pinane hydroperoxide.

14. The three-pack curable composition according to claim 13, wherein the peroxide of the third pack is methyl iso-propyl ketone peroxide.

15. The three-pack curable composition according to claim 7, wherein the peroxide of the third pack is selected from ketone peroxides and organic hydroperoxides.

16. The three-pack curable composition according to claim 15, wherein the peroxide of the third pack is a ketone peroxide selected from the group consisting of methyl ethyl ketone peroxide, methyl iso-propyl ketone peroxide, cumyl hydroperoxide, 1,1,3,3-tetramethylbutyl hydroperoxide, and pinane hydroperoxide.

17. The three-pack curable composition according to claim 16, wherein the peroxide of the third pack is methyl iso-propyl ketone peroxide.

18. A process for curing the three-pack curable composition according to claim 7, said process comprising mixing the first pack, the second pack, and the third pack.

19. The process according to claim 18, wherein the mixing is performed in the presence of at least one material selected from a reinforcement fibre and a filler.

20. The process according to claim 19, wherein the reinforcement fibre is selected from carbon fibre, glass fibre, aramid fibre, a natural fibre, and combinations thereof; and the filler is selected from sand, quartz, aluminum trihydroxide, magnesium hydroxide, chalk, calcium hydroxide, clays, and lime.

\* \* \* \* \*